Feb. 3, 1953 W. BORBERG 2,627,381
WINDING TAKE-UP MECHANISM
Filed Aug. 9, 1949 3 Sheets-Sheet 1
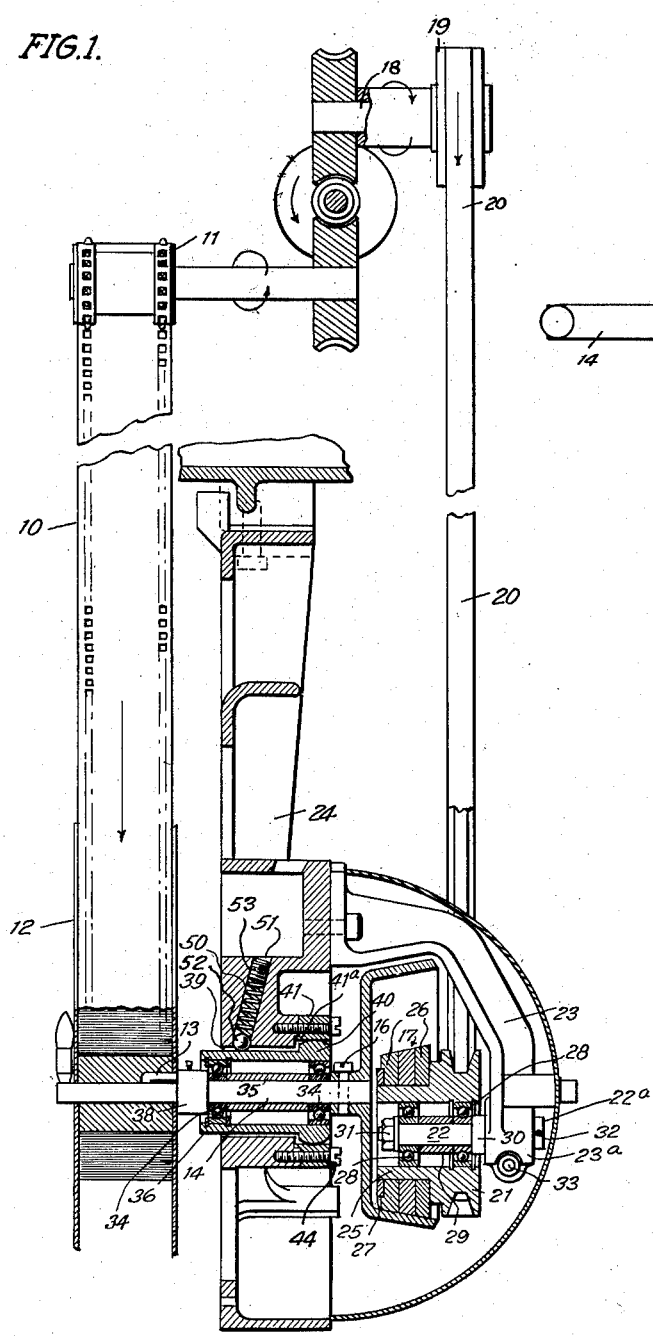
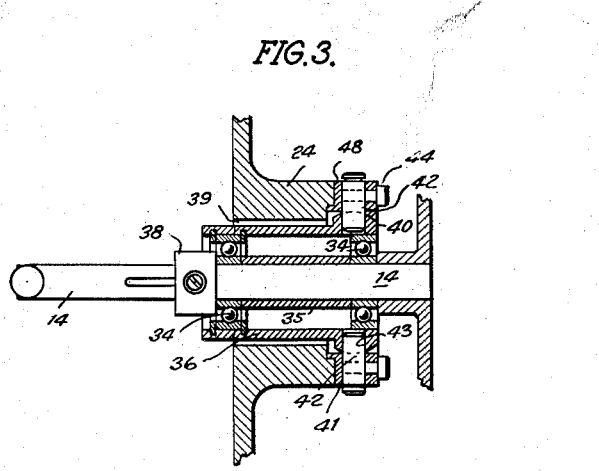
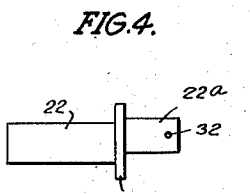
INVENTOR
WILLY BORBERG
BY James B Boyer
ATTORNEY

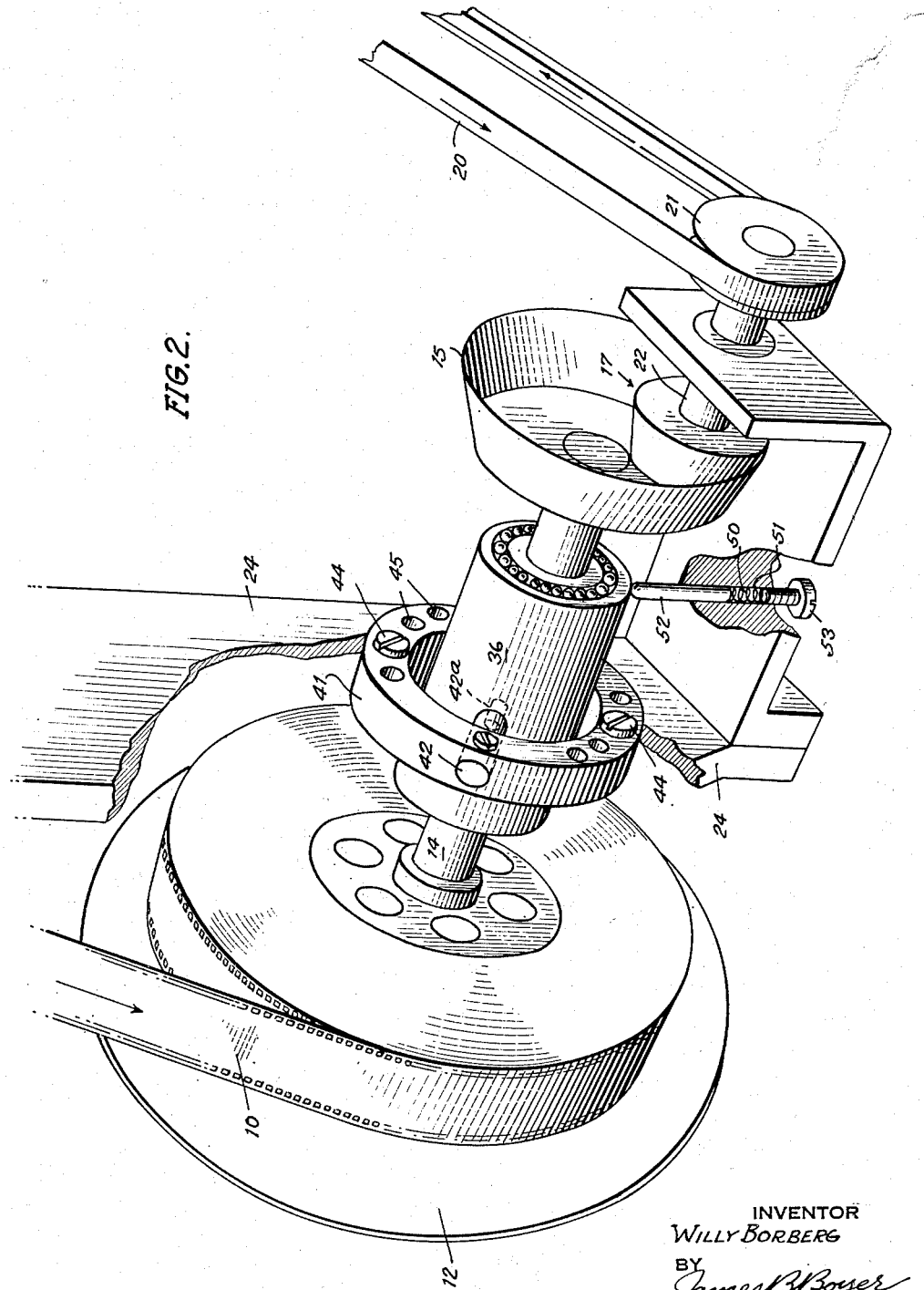

INVENTOR
WILLY BORBERG
BY
James B Boyer
ATTORNEY

Patented Feb. 3, 1953

2,627,381

UNITED STATES PATENT OFFICE 2,627,381

WINDING TAKE-UP MECHANISM

Willy Borberg, North White Plains, N. Y., assignor to International Projector Corporation, Bloomfield, N. J., a corporation of Delaware Application August 9, 1949, Serial No. 109,265

14 Claims. (Cl. 242—55)

The present invention relates to motion picture projecting machines, and more particularly to improvements in take-up mechanisms, designed for reeling or winding motion picture film, but the invention is also capable of use in winding sheets, and ribbon-like or thread-like material wherein an even tension is to be preserved as the diameter of the roll of material being wound increases on the take-up reel or spool.

At the beginning of a winding operation wherein the film or other material is fed at a constant speed, the leading end of the material is coiled on a hub of small diameter of the take-up reel, and the speed of rotation of the reel is at that time high, but as the diameter of the material being wound increases, the winding speed of rotation of the reel will progressively diminish, with a consequent reduction in tension and in the degree of tautness with which the material is wound on the reel, unless means is provided to introduce a progressively increasing torque proportionately as the diameter of the material increases.

Discussing the invention as used in winding motion picture film, it will be understood that the film, after passing through the projector and sound head, enters the take-up magazine at a constant uniform speed to be wound on a take-up reel. As the trade, at present, uses take-up reels having two-inch, four and five-inch hubs, a single take-up mechanism should be capable of accommodating these and other sized reels. Take-up reels with hubs of smaller diameter should be driven at a higher starting speed than is required when take-up reels having hubs of larger diameter are used. The smallest hub used determines the free running speed of the take-up mechanism.

To insure a snug winding of the film on the reel as well as to compensate for any unusual slack occurring in the strip of film between the hold-back or supply sprocket and the take-up reel at the start of a winding operation, it is desirable that the peripheral speed of the reel hub be slightly greater than the linear feed of the film, to thus provide an over-riding speed margin. As soon as the strip of film becomes taut, this speed difference is eliminated.

Other factors further militate against a satisfactory winding operation, such as a change in torque due to a variation in the slip speed between the friction surfaces caused by a viscosity change of the lubricant employed therewith and the increased bearing friction due to the increase of the weight of the material as it builds up on the reel. In some instances, the combination of these deterrent factors may result in stalling the reel, and if, in an attempt to obtain a more tightly wound reel and prevent stalling, the tension is increased above the safety limit at the beginning of the winding operation, as when winding film, the additional strain thus placed on the film must be absorbed by the walls of the perforations which engage the hold-back sprocket teeth. This often results in tearing out the sprocket perforations in the film with consequent serious damage to the film, and in opening splices. Also such excessive tension will cause the edges of the sprocket holes in the film to undercut or "hook" the teeth of the hold back sprocket, which hooked teeth can further damage the film. Furthermore, as the film tension decreases proportionately to the increasing diameter of the roll of film as it builds up on the reel, the film progressively becomes more loosely wound, and "cinching" is liable to occur as the layers of film are coiled. The same slippage of layers of film or cinching will occur during the subsequent rewinding of a loosely wound roll of film. Lastly, a loosely or unevenly wound reel of film will tend to shrink or buckle unequally throughout its length, when the reel is stored.

A torn or damaged film is likely to cause a "break in the show," that is, result in an interruption of the projection of film images on the screen, necessitating repairs to the film, as well as constituting a fire hazard, and a sliding or cinching of the film layers on each other is likely to produce streaks and lines on either side of the film and across the picture and sound track areas, which streaks and lines appear on the screen, and can be heard as noise from the speakers.

Several instrumentalities have been devised to remedy the foregoing disadvantages and objections, examples of which are disclosed in U. S. Patents to Frappier and Boecking, No. 1,857,780, issued May 10, 1932; Kindelmann and Boecking, No. 1,827,893, issued October 20, 1931; Bradford, No. 2,436,418, issued February 24, 1948, and Emory, No. 1,277,559, issued September 3, 1918, relatively to which patents the present invention is an improvement.

One object of the invention resides in the combination with a means to feed the film to the take-up reel at a uniform rate, and with a drive for the take-up reel at a somewhat higher uniform speed, whereby the reach of film between the film feeding means and the take-up reel is tensioned, of an internal friction cone drive mechanism, the separate centers of rotation of the drive and driven cones being respectively offset or relatively eccentric, whereby the static friction is overcome at the start of rotation of the internal friction cone members, to eliminate the jerky action of the take-up reel and thus avoid the imposition of sudden excessive strain on the film not only at the beginning of, but throughout, the winding operation, and to maintain an even tension on the reach of film as the diameter of the film increases.

It will be understood that the use under the above conditions, of off-set or relatively eccentric internal friction cone members, provides a drive wherein the larger diameter of the effective area at one end of the driving friction cone will tend to drive the driven friction cone at a higher rate of speed than does the effective area of the smaller end of the drive cone, and since the driven cone cannot turn at two different speeds at the same time, the actual speed imparted to the driven cone will be controlled by the amount of resistance to rotation to be over-come by the driving cone.

This results in the provision of a very flexible self-adjusting friction drive which instantly adapts itself to varying resistances.

An additional advantage inherent in this invention is the provision of a smooth, shock-free action from the beginning of the winding operation to the end thereof, the mechanism requiring a minimum of maintenance with few, if any, periodical adjustments.

A further object of this invention is to provide for a novel adjustment of the entire driven section of the take-up mechanism to regulate the degree of tension to be applied to the reach of film or other material extending from the feed mechanism to the take-up reel or receiving member.

By circularly adjusting the driven section of the take-up mechanism, to shift the fulcrum farther from the horizontal, a lesser gravity component will be transmitted through the driven section to the driven and driving members, resulting in lessening the progressive degree of tension applied to the reach of film below that which would be applied if the fulcrum lay in a horizontal plane.

The foregoing adjustable feature is also of advantage under the following condition. The driven section of the take-up mechanism normally lies substantially at right angles to the optical axis of the projector. However, it is often necessary to tilt the projector to properly locate the pictures on the screen, such tilting being as high as 30° in some installations. Such tiltings will displace the fulcrum of the take-up mechanism out of its position with respect to the force of gravitation.

By rotatably adjusting the fulcrum supports and the fulcrums relatively to the driven spindle, to the right or left, this tendency may be compensated for by restoring the fulcrum points toward the horizontal wherein the gravitational effect is greatest.

An additional object is the provision of novel means to maintain the hub of the take-up reel in parallelism with the axis of the hold back sprocket, or otherwise worded, at right angles with the longitudinal center of the film, so that the film will wind evenly and smoothly on the take-up reel without cocking or piling up against either side of the reel, and this same mechanism is utilized to enable the adjustment of the drive cone to take up or compensate for wear of the friction surfaces of the cones, which wear would permit the driven shaft and its take-up reel to rock out of parallelism with the hold-back sprocket shaft and sprocket, thus throwing the take-up sprocket out of true relatively to the film.

Another object is the provision of a novel arrangement to initially maintain a more even tension on the reach of film, by applying pressure to the take-up mechanism to offset the low tension of the film at the start of an operation, which applied pressure is gradually and automatically relieved or superseded as the gravity component increases.

The incoming film under tension, winds on a hub of relatively small diameter almost in line with the gravity component, and, since the winding is clockwise when viewed from the right hand or operator's side of the machine, the winding pull will tend to cancel out the force of gravity which controls the amount of friction required for proper winding. This reactive force influences the performance for but a few moments only, after the start, and will be gradually offset or eliminated by the increase in film weight and the growing coil diameter, the latter also causing a change in the angle at which the film approaches the reel to relieve the cancelling out effect present when the film diameter is small.

To overcome the deviation from the desired functioning and to supplement the weight effect of an empty reel on the internal drive, a preloading spring is provided to maintain sufficient friction between the drive and driven members of the internal drive to set up tension in the reach of film at the beginning of the winding operation.

The fulcrumed take-up mechanism enables the pre-loading spring to be so applied, that unlike the prior art, the influence or effect of the pre-loading spring gradually diminishes until its force becomes ineffective as the weight of the film on the reel increases.

The invention further contemplates the novel fulcrum arrangement for the driven elements of the take-up mechanism or tension transmission, and also, the means to adjust such fulcrum points to regulate or control the degree of tension transmitted to the reach of film between the film feeding mechanism and the take-up reel, as well as to maintain the film against torsional twisting.

To these and other ends, the invention comprises certain novel features and combinations of parts, all of which will be more fully disclosed in the following specification and particularly pointed out in the claims.

In the accompanying drawings forming a part of this application,

Fig. 1 is a vertical sectional view showing one form of the invention applied to a film winding mechanism and its driving connection, the film being led from a power-driven hold-back sprocket to the take-up reel;

Fig. 2 is a schematic and partly perspective view of the take-up means for adjusting the fulcrum of the driven shaft;

Fig. 3 is a detail sectional view of the fulcrum means for the driven section of the take-up mechanism;

Fig. 4 is a detail side view of that form of the eccentric stationary shaft for the drive cone shown in Fig. 1, the eccentricity or offset of the shaft being somewhat exaggerated;

Figure 5:
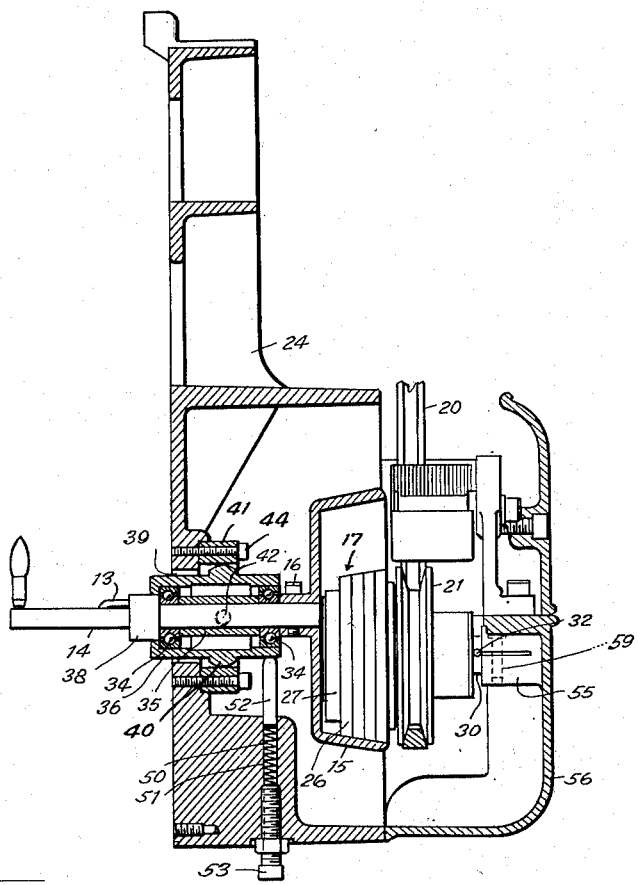
Fig. 5 is a vertical sectional view similar to Fig. 1 but showing slight modifications thereof.

Referring to Fig. 1 of the drawings, the film 10 is fed from the lower or hold-back sprocket 11 of a motion picture projector or sound head (not shown), the sprocket being driven from a shaft 10 18 forming part of the drive mechanism of the motion picture machine, at a rate of, say, 360 revolutions per minute, which results in feeding the film strip out of the sound head at a uniform rate of 90 feet per minute in conformity with the normal rate of feed of the film through motion picture machines now on the market.

The film is led from the lower sprocket 11 to the hub of an empty take-up reel 12 removably splined, as at 13, to the projecting outer end of a driven spindle or shaft 14 constituting a part of my improved take-up mechanism.

The longitudinal axes of the lower or hold-back sprocket 11 and of the spindle or driven shaft 14 of the take-up reel lie in parallel horizontal planes, the sprocket and reel also lying, respectively, in parallel vertical planes, so that the longitudinal center of the film is at right angles thereto.

In that form of the invention herein shown, a female internal friction cone 15 is secured, as by a fastening 16, to the inner end of the take-up spindle 14, for engagement by a male driving friction cone 17 journaled on a stationary shaft 22 mounted eccentric to the driven spindle 14, the driving cone engaging the inner periphery of the larger driven cone 15 along a line beneath the axis of rotation of the driven cone. Obviously, the locations of the driving and driven members are reversible, without altering the inventive concept, the respective cones constituting the drive and driven members of an internal friction clutch.

The driving friction cone member 17 may be rotated at a constant speed by a separate motor, but conveniently, the driving friction cone is operated from the usual power shaft 18, for instance, by a V-belt 20 connecting a pulley 19 fast on the power shaft with a pulley 21 secured to the internal male driving cone 17, the stationary supporting shaft 22 of which projects inwardly from a rigid bracket arm 23 depending from the machine frame standard 24.

In ordinary use, the friction surfaces of slip clutches become covered with a thin coating of oil which introduces a change in the friction coefficient due to change of oil viscosity at varying temperatures, particularly with the disc type friction drives, so that at lower temperatures a severe jerk may occur at the moment of starting. A relatively considerable force is required to break the static friction oil film between the friction discs, and the harmful effect upon the film at that time being wound is heightened if slack is present in the reach of film between the hold-back sprocket 11 from which the film is led to the take-up reel and its spindle. Such slack permits the take-up reel and its spindle to gather momentum, and as the driving and driven members 17 and 15, respectively, of the friction drive remain engaged, a slippage between such members occurs only when the film is pulled taut, with a consequent heavy snap to the film.

The transition from static to dynamic friction results only from the hold-back action of the film which is delivered from the lower hold-back sprocket to the winding reel at a linear speed somewhat slower than the peripheral speed of the reel hub. The jerking action is more noticeable at the beginning of the winding operation when the tension is highest, than near the end of the winding operation, due to the fact that the unevenness of torque as transmitted through the friction drive results from the then small starting coil diameter in contrast to the larger coil diameter (or longer leverage) as the coil diameter of the film or other wound material, increases.

To remedy the foregoing condition a calculated difference is provided between the speeds of rotation of the hold-back sprocket 11 and the pulley 21, the driving cone 17 rotating at a somewhat higher rate of speed than the rate at which the film is fed from the lower feed or hold-back sprocket 11, and as a result, the reach of film between the hold-back sprocket 11 and the take-up reel 12 becomes tensioned immediately after the internal drive cone 17 starts its rotation, the leading end of the film, after being threaded through the projector and sound head, having been secured to the hub of the take-up reel.

Excess slack, if any, in the reach between the lower sprocket and the take-up reel after the threading operation, will be immediately taken up at the start, when the peripheral speed of the take-up reel substantially equals the speed of rotation of the driving cone, there being no tension on the reach of film at this time, but as soon as the slack is wound on the reel, tension is applied to the reach of the film, due to the excess speed of the clutch drive member 17 over the linear feed of the film, which tension operates to slightly retard the speed of rotation of the take-up reel. As a result, slippage occurs between the internal driving and driven cones 17 and 15 throughout the line contact between the cones, to relieve the film of undue tension.

The friction drive member 17 comprises a cylindrical shell 25 (Fig. 1), the outer end of which shell is provided with the lower V-belt pulley 21. A series of perforated circular discs 26, of suitable material, as leather, is mounted on the inner end of the cylindrical shell, the discs being graduated in diameter and having consecutively beveled or inclined peripheries to form a frusto-conical laminated friction facing corresponding in angularity to the angularity of the inner periphery of the female friction cone 15. The series of laminate facings 26 at one end are backed up against the inner face of the lower pulley 21, a retaining ring 27 at the opposite end of the cylindrical shell of the male friction member operating to hold the facing rings 26 in place.

The male friction drive member with its pulley 21 turns on ball bearings 28, 28 mounted on the supporting shaft 22, the ball bearings 28 being held apart by a spacer 29 and retained against axial movement along the supporting shaft 22 by a fixed collar 30 at one end and by a nut and washer 31 at the opposite end, respectively.

That end of the supporting shaft 22 on which the conical friction drive member turns, projects into the female friction driven member 15, and the lower end of the depending bracket arm 23 is split to form a clamp 23a in which the outer end of the supporting shaft 22 is mounted. A clamping bolt 33 holds the split clamping jaws of the bracket arm firmly embracing the supporting shaft.

The driven take-up spindle or shaft 14 is mounted intermediate its ends in ball bearings 34, 34, separated by a cylindrical spacer 35, the ball bearings, in turn, being mounted in a floating sleeve 36. Snap rings of well known design retain the outer ball bearing in place assisted by a set collar 38 fastened to the protruding part of the driven spindle or shaft 14. The inner ball bearing abuts the end of the hub of the female friction cone driven member 15 pinned at the inner end of the driven shaft 14.

The floating sleeve 36 lies in and projects loosely through an enlarged opening 39 formed transversely through the machine frame 24, and in turn, is encircled by a fulcrum or bearing ring 41, the ring being secured by retaining means, as the screws 44, to the frame 24 at one end of, and around, the opening 39. The inner perimeter of the ring opening may constitute an extension of the opening 39, the inner face of the ring being shouldered, as at 41a, to fit a correspondingly shouldered circular seat around the opening 39 forming a centering seat to insure the proper positioning of the fulcrum ring on the frame, in assembling the mechanism, and for circular adjustment, as hereinafter referred to.

Referring to Figs. 2 and 3, a pair of diametrically opposed fulcrum pins 42 project normally horizontally through the fulcrum ring 41 from opposite sides thereof, the inner ends of the fulcrum pins entering correspondingly diametrically opposed holes 43 formed in the floating sleeve 36, to pivotally support the sleeve and its associated parts for rocking movement. And since the rocking movement is substantially in a vertical plane, it will be seen that in one direction, the driven cone can rock away from the drive cone and simultaneously raise the outer end of the take-up spindle towards the hold-back sprocket 11.

Any convenient means may be provided to prevent sidewise play of the floating sleeve 36 along the fulcrum pins 42. In Figs. 1 and 5, the floating sleeve is provided with a circumferential bead 40 through which the holes or sockets 43 are formed, the thickness of the bead from its inside to its outside diameters being sufficient to take up substantially all of the space between the floating sleeve and the inside diameter of the fulcrum ring 41 without preventing the floating sleeve from freely rocking in the frame opening 39. To facilitate such rocking, the outer circumference of the bead 40 may be rounded as shown.

In Fig. 2, the inner ends of the fulcrum pins 42 are reduced to form shoulders 42a, as shown in dotted lines, the reduced ends of the pins entered in the opposed holes 43 of the floating sleeve, the shoulders 42a contacting the circumference of the floating sleeve 36 to maintain the sleeve centered in its opening 39.

To enable the fulcrum ring 41 with its fulcrum pins 42 and floating sleeve 36 to be circularly adjusted around the frame opening 39, for a purpose soon to be explained, the fulcrum ring may be provided with an arcuate series of holes 45 (Fig. 2) adjacent the respective fulcrum pins 42, the fastening screws 44 being capable of entering any of said series to secure the ring firmly to the machine frame.

The longitudinal axes of the fulcrum pins 42 are alined and lie transversely to, but normally in the same horizontal plane with the longitudinal axis of the driven spindle 14.

It is desirable that the increasing weight of the film, as it is coiled on the take-up reel, be utilized to automatically control the degree of pressure exerted by the inner periphery of the driven friction cone against the periphery of the drive cone, whereby to reduce the amount of friction between the conical contacting faces of the drive and driven cones. Variation of friction enables the drive cone to turn the driven cone with its spindle and take-up reel at such a speed as will retain the reach of film under a satisfactory degree of tension beyond which the hold-back action of the film will still cause slippage between the driving and driven members.

It is evident that the driven section of the take-up or winding device is pivoted or fulcrumed so as to be substantially balanced. Also it is obvious that the action of gravity on the take-up reel and its coils of film will be more pronounced when the fulcrum or pivotal axis of the driven section is substantially horizontal.

The rotary adjustment of the automatic control of the take-up mechanism is provided to compensate for variations of the angle of projection, so that the longitudinal axes of the fulcrum pins 42 may be kept horizontal regardless of the angle of tilt of the optical axis of the projector.

When projecting at an angle up to 30 degrees, it is necessary to tilt the machine to properly position the images on the screen. This tilting adjustment is effected in the usual manner by tilting the projector pedestal (not shown) which supports both the projector and the sound head to which latter the frame 24 is fastened, so that such adjustment affects the projector and take-up mechanism alike, the result of which will displace the longitudinal axes of the fulcrum pins 42 away from the horizontal plane and reduce the effect of gravity represented by the weight of the film and film reel, on the pressure engagement of the internal friction cones. In other words, the gravity component, instead of working at right angles on the end of the spindle 14 supported intermediate its ends on fulcrums at right angles to the force of gravity, will work at an acute angle to the longitudinal axes of the fulcrum pins, with a resultant loss in the transmission of the force of gravity to the internal cone drive.

To compensate for or neutralize the effect of this displacement, the bearing ring 41 together with the fulcrum pins 42 and the floating sleeve 36 are rotatable in either direction with relation to the machine frame to restore the fulcrum pins towards their horizontal position and thus retain the reach of film under tension. This adjustment is readily obtained by providing the ring with the series of holes 45 so that upon the removal of the fastening bolts or screws 44, these parts can be rotated to position the fulcrum pins 42 nearer the horizontal plane.

It will be noted that this method of adjustment is greatly facilitated by the particular structure constituting a part of this invention, in that the driven section of the tension transmission including the driven spindle with its friction cone and winding reel are supported as a whole by the fulcrumed sleeve 36 with which the bearing ring 41 is associated.

This compact yet flexible arrangement also enables the provision of a further novel feature. The uniformity of tension of the reach of film cannot be maintained entirely by the regulatory weight effect of the reel and film to regulate the intensity of pressure between the drive and driven members of the friction cones, particularly as at the beginning of the winding operation when there is little film on the reel, a low tension condition may exist.

The incoming film, under such low tension, winds on the hub of the reel, almost in line with the gravity component, and since the winding is in the opposite direction to the force of gravity, that is, such tension as is present in the reach of film, is exerted upwardly, it tends to cancel out the force of gravity which controls the amount of friction needed for proper winding tension. This reactive tendency influences the operation only for a short time after the start, and will be gradually offset by the weight of the film as it continues to be wound on the reel, and the accompanying increase in coil diameter which effects a change in the angle at which the descending reach of film approaches the reel.

To overcome this deviation from the proper operation in the early winding stage, means in the form of a pre-loading spring 50 is provided and so arranged as to act upon the spindle or driven shaft 14 with sufficient force to set up a pressure frictional contact between the drive and driven friction cones 17, 15 whereby to maintain the film under proper tension at the beginning of the winding operation.

To this end, the pre-loading spring 50 in Fig. 1, is housed in a hole 51 drilled through a part of the machine frame 24, such hole leading to the opening 39 occupied by the floating sleeve 36, to one side or the other of the fulcrum pins 42. In Fig. 1, the pre-loading spring 50 exerts its force against the periphery of the floating sleeve 36 near the outer end of the sleeve through a friction reducing element, as a ball 52 in the hole 51 between the spring 50 and the sleeve 36, the tension of the spring being regulated by a screw stud 53 threaded into the outer end of the drilled hole 51.

It will be noted that the direction of pressure of the pre-loading spring is exerted against the floating sleeve to rock the driven spindle 14, reel 12 and female friction cone 15, at substantial right angles to the longitudinal axes of the fulcrum pins 42, to press the spindle in such direction as to increase the pressure between the cones.

The pre-loading spring pressure is gradually overcome or superseded as the film weight to spring pressure ratio becomes progressively larger, and as the angle formed by the gravity component and the direction of film tension increases, so that the forces opposing the effective operation of the parts cease to have any effect after a certain point.

The tension of the spring 50 is adjustable, and acts upon the friction surfaces to permit an initial setting of the torque transmitted to the take-up spindle and the winding reel.

Assuming that the torque remains constant throughout the operation of winding a film on the reel, and that the initial tension on the material being wound is adjusted to an amount as high as safety permits without damage to the material being wound, the increasing diameter of the material as it builds up around the reel hub will proportionately reduce the tension on the material being wound as the winding operation proceeds, so that as the operation nears completion the tension on the material will be considerably lower than is required to obtain a snugly wound tight reel.

From the foregoing, it is seen that the invention constitutes a very simple and compact means for supporting the take-up reel and driven friction cone, to enable the frictional contact between the drive and driven cones to automatically provide the torque necessary required to maintain an even and uniform tension in the reach of material being wound.

The eccentrically arranged internal friction cone driving means for the take-up reel provides a better driving surface in contrast to an external friction drive, or to the concentric internal friction cone drive and also gives proper direction of rotation. In the particular form of internal friction cone drive employed in this invention, rolling of the two eccentrically mounted friction members against each other without slippage occurs only over an infinitely small area between the drive and driven cones, which area is virtually confined to a line contact, whereas all other contact surfaces have a certain amount of slip, even when the driven cone is free running without being held back. Under actual winding conditions, the eccentrically mounted drive cone will also have a higher surface speed than the inside surface of the driven cone. The slip speed over the contact surface will always vary slightly, so that this differential slip breaks up almost all static friction at the instant the drive cone starts to rotate.

In the transmission of a constant amount of power to the periphery of the winding reel, it is desirable to reduce all uncontrollable and variable frictions in the support bearings of the take-up spindle, and also to resist the axial thrusts set up in both the drive and driven shafts, which can best be effected by using ball bearings.

It is very necessary that the hub of the take-up reel 12 remains in substantial parallelism with the hub of the hold-back or lower feed sprocket 11 at all times during the winding operation to prevent the film from piling up or riding up on the side flanges of the reel, as the film is being wound.

Therefore, because the take-up reel has a rocking support, it is necessary to provide means to maintain the take-up reel and its drive spindle in such position that its hub lies at right angles to the longitudinal axis of the film as it winds on the hub.

To this end, when adjusting the device, after assembly, the clamping screw 33 (Fig. 1) at the lower end of the depending arm 23 of the frame is loosened to release the clamping jaws 23a from the eccentric outer section of the stationary supporting shaft, and a suitable spanner wrench or tool (not shown) having a tooth, is applied to the projecting outer end of the eccentric portion 22a which is peripherally recessed or drilled, as at 32, in which the tooth of the spanner wrench fits.

Pressure on the wrench turns the eccentric section 22a together with the stationary supporting shaft 22 in its clamping jaws 23a to slightly raise or lower the supporting shaft with its drive cone 17 fast on its inner end.

And since the internal drive cone 17 contacts the flange of its associated driven cone 15 mounted on the floating driven shaft 14 to one side of the fulcrum 42 of the shaft, as seen in Fig. 2, bodily movement of the drive cone and its shaft 22 upwardly will shift the drive cone away from its contact with the driven cone to enable the entire driven section of the take-up mechanism to rock in counterclockwise direction (Fig. 1), by gravity, assisted by the pre-loading spring 50, thereby slightly lowering the take-up reel 12. Vice versa, downward movement of the stationary eccentric shaft 22 presses the drive cone against the driven cone to rock the entire driven section clockwise (Fig. 1), thereby slightly raising the take-up reel 12. The eccentric supporting shaft 22, 22a is rotated to such position that it will retain the driven section with its spindle 14 in horizontal position, so that the hub of the take-up spindle lies in parallelism with the holdback sprocket 11.

This same adjusting mechanism is utilized to adjust the drive cone relatively to the driven cone where necessary to compensate for wear of the friction surfaces of the cones, and such compensating adjustment will still retain the rocking driven section of the take-up mechanism in its substantially horizontal position.

In the slightly modified structure shown in Fig. 5, the outer end of the eccentric, stationary supporting shaft 22 is gripped in a split socket 55 formed on the inner face of the lower half of a casing 56, the socket being provided with a fastening screw 59 to clamp the split socket about the outer eccentric section 22a of the stationary shaft. Holes 32 are drilled in the collar 30 of the shaft to accommodate the tooth of a spanner wrench whereby the eccentric shaft may be adjusted in the manner above explained.

However, it is obvious that in both forms shown in Figs. 1 and 5, the stationary supporting shaft may be straight, one end of which may be mounted in an eccentric bushing, the outer end of the bushing being drilled to accommodate the tooth of a suitable wrench for rotatably adjusting the vertical position of the straight stationary shaft in the same manner as heretofore explained. In such cases, the shaft 22 may function as a drive shaft to which the driven pulley 21 may be fast.

In Figs. 2 and 5, the pre-loading spring means 50—53, has been re-located, but its structure and operation are substantially identical, the pin 52 of Fig. 5, being substituted for the ball 52 of Fig. 1.

In Fig. 2, the floating sleeve 36 is shown supported on the inner ends of fulcrum pins 42 shouldered, as at 42a to retain the floating sleeve 36 centrally of the opening 39 in the machine frame against lateral displacement, instead of using the circumferential bead 40 of Fig. 1 with plain fulcrum pins.

Also, in Fig. 5, the location of the circumferential bead 40 has been changed from the position at one end of the floating sleeve 36 shown in Fig. 1, to a position substantially midway of the longitudinal center of the sleeve, the purpose and operation being as heretofore explained.

Figure 6:
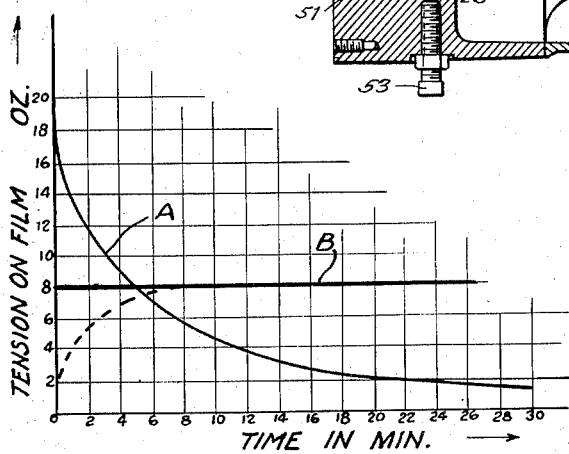
Fig. 6 is the representation of a graph showing the difference in developed tensions between the take-ups of the prior art and that of the present invention.

The graph shown in Fig. 6, is a comparison of the amount of tension on the film during the winding thereof on take-ups heretofore in use, represented by the curve A, where the vertical indicates the tension in ounces, and the horizontal base line, the time in minutes, or the length of film in feet.

The full line B indicates the much more uniform tension of the film when being wound by the use of the present invention, equipped with the pre-loading spring, the dotted portion indicating the developed tension by the use of the present invention with the omission of the pre-loading spring.

Other changes may be made in the form and arrangement of the several parts described, and omissions and substitutions effected by those skilled in the art without departing from the spirit of this invention.

What is claimed as new is:

1. In a gravity-controlled coil winding mechanism, the combination of a supporting shaft; a conical friction drive cone on the supporting shaft and driven at a uniform speed; a driven shaft in eccentric relation with the longitudinal axis of the drive cone; an internal friction cone on the driven shaft, the inner perimeter of the driven cone engaging the driving cone; a material-receiving member connected with the driven shaft and to which member the material is fed at a constant linear speed, the contact surfaces between the drive and driven cones effective to absorb through frictional slippage, the speed differences developed by the increasing coil diameter on the receiving member, a fulcrumed bearing means to support the driven shaft for rotation; fulcrum pins at substantially right angles to the gravity component to pivotally support the bearing means and driven shaft for rocking movement; and means to rotatably adjust the fulcrumed bearing means and its fulcrum pins to regulate the effect of gravity on the fulcrumed driven shaft and its cone.

2. In a gravity-controlled coil winding mechanism, the combination of a supporting shaft; a conical friction drive cone on the supporting shaft and driven at a uniform speed; a driven shaft in eccentric relation with the longitudinal axis of the drive cone; an internal friction cone on the driven shaft, the inner perimeter of which cone engages the driving cone along a line transverse to its inner perimeter; a material-receiving member connected with the driven shaft to which the material is fed at a constant linear speed, the contact surfaces between the drive and driven cones being effective to absorb through frictional slippage, the speed differences developed by the increasing coil diameter on the receiving member, a fulcrumed bearing means on which the driven shaft is supported for rotation; a bearing ring encircling the bearing means; and fulcrum pins engaging the bearing ring and the bearing means to pivotally support the bearing means, the driven shaft; the receiving member and the driven cone for limited tilting movement.

3. In a gravity-controlled coil winding mechanism, the combination with a friction drive element rotated at a uniform speed; a driven shaft; a friction driven element on the driven shaft and engageable with the friction drive element; and a material-receiving member connected with the driven shaft to which the material is fed at a constant linear speed, the contact surfaces between the drive and driven elements being effective to absorb through frictional slippage, the speed differences developed by the increasing coil diameter on the receiving member; of a bearing means which supports the driven shaft for rotation; a rotatably adjustable bearing ring encircling the bearing means; a circumferentially rounded spacing bead projecting from the bearing means to engage the bearing ring; and fulcrum pins mounted in the bearing ring and engaging the spacing bead to support the bearing means with its associated parts for limited tilting movement.

4. In a gravity-controlled coil winding mechanism, the combination with a friction drive element rotated at a uniform speed; a driven shaft; a friction driven element on the driven shaft, engaged with the friction drive element; and a material-receiving member connected with the driven shaft to which the material is fed at a constant linear speed, the contact surfaces between the drive and driven elements being effective to absorb, through frictional slippage, the speed differences developed by the increasing coil diameter on the receiving member; of a fulcrumed bearing means within which the driven shaft is supported for rotation and for limited tilting movement; and a pre-loading device engaging the fulcrumed bearing means to insure an initial contact of the driven friction element with the drive friction element.

5. In a gravity-controlled coil winding mechanism, the combination with a friction drive element rotated at a uniform speed; a driven shaft; a friction driven element on the driven shaft and engaged with the friction drive element; and a material-receiving member connected with the driven shaft to which the material is fed at a constant linear speed, the contact surfaces between the drive and driven elements being effective to absorb through frictional slippage, the speed differences developed by the increasing coil diameter of the receiving member; of a fulcrumed bearing means on which the driven shaft and its associated parts are supported for rotation, and for limited tilting movement; and a pre-loading device to engage the bearing means to insure an initial contact of the driven with the drive friction element, said pre-loading device being overcome by the increasing weight of the material wound on the receiving member in combination with the increasing coil diameter on the receiving member as the material is wound on the receiving member.

6. In a gravity-controlled coil winding mechanism, the combination of a friction drive element rotated at a uniform speed; a driven shaft; a friction driven element on the driven shaft, engaged with the friction drive element; a take-up member connected with the driven shaft to which the material is fed at a constant linear speed, the contact surfaces between the drive and driven elements being effective to absorb through frictional slippage, the speed differences developed by the increasing coil diameter on the receiving member; a stationarily-mounted pre-loading device effective on the driven shaft, and adjustable to insure an initial contact of sufficient force between the driving and driven friction elements; and means to pivotably support the driven shaft with its driven element and the take-up member to enable the increasing weight of the material wound on the take-up member to overtake and supersede the effect of the pre-loading device on the driven shaft.

7. In a winding mechanism, the combination of a supporting shaft and a driven shaft arranged parallel and in constant eccentric end to end relation; a flanged female internal friction cone on one of said shafts and a male friction cone on the other of said shafts, the male cone engaged with the internal face of the flange of the female cone; a take-up reel rotatable from the driven shaft; means to pivot the driven shaft at a point between the driven friction cone and the take-up reel; means to feed the material to be wound, to the take-up reel; and means to adjust the supporting shaft of the drive cone in a direction transversely to the longitudinal axis of the driven cone to maintain the driven shaft and the take-up reel in a plane at right angles to the direction of feed of the material, and to compensate for wear between the friction surfaces.

8. In a gravity-controlled coil winding mechanism, the combination, with a frame having an opening, a friction drive element, a driven shaft, a friction driven element on the driven shaft and with which the friction drive element engages, a take-up reel connected with the driven shaft, to which the material to be wound is fed; of a sleeve supported for rocking movement in the frame opening, and located intermediate the driven element and the take-up reel, through which sleeve the driven shaft extends; fixed bearings in the sleeve to wholly support the driven shaft for rotation within the sleeve; and means mounted on the frame adjacent the opening, and encircling the sleeve exteriorly thereof, to afford a fulcrum support for the rocking sleeve.

9. In a gravity-controlled coil winding mechanism, the combination, with a frame having an opening, a friction drive element, a driven shaft, a friction driven element on the driven shaft and with which the friction drive element engages, and a take-up reel to which the material to be wound is fed, said reel being connected with the driven shaft, of a sleeve supported for rocking movement in the frame opening, and located intermediate the driven element and the take-up reel, through which sleeve the driven shaft extends; fixed bearings in the sleeve to wholly support the driven shaft for rotation relatively to the sleeve, and to maintain the shaft concentric with the sleeve; and means mounted on the frame adjacent the opening therein, and adjustable transversely about the longitudinal axis of the driven shaft and encircling the sleeve, said sleeve being pivotally connected to said means to support the sleeve and shaft for rocking in a substantially vertical plane in various tilted positions of the frame.

10. In a gravity-controlled coil winding mechanism, the combination with an apertured frame; a drive shaft, a friction drive element disposed on said drive shaft; a driven shaft, a friction driven element disposed on said driven shaft, and a take-up reel on said driven shaft; of a tubular member having diametrically opposed seats on the periphery thereof encircling said driven shaft and extending through the apertured portion of said frame; bearings in said tubular member arranged to support said driven shaft in co-axial relation with the tubular member at all times; a bearing ring encircling said tubular member and normally secured to the frame about the aperture therein; and diametrically opposed, shouldered fulcrum pins mounted in and projecting from the inner periphery of the ring and seated in said tubular member to pivotally suspend the tubular member with its driven friction element, driven shaft, and take-up reel for rocking in a vertical plane, wherein shoulders formed on said fulcrum pins space said tubular member from said bearing ring.

11. In a winding mechanism having a major axis of tilt and having a driving shaft normal to said axis, a driven shaft axially displaced from said driving shaft, frusto-conical friction members fixed to one end of each of said shafts and arranged to transmit power through eccentric engagement therebetween, and a material-handling member disposed on the end of said driven shaft opposite that to which said friction member is fixed; the combination of means for maintaining constant tension in material to be wound on said material-handling member, comprising a tubular member disposed centrally about said driven shaft, bearings disposed in said tubular member to support said driven shaft co-axially with said tubular member, a bearing ring surrounding said tubular member and having a substantial annular clearance therefrom, oppositely disposed fulcrum members extending into engagement with said tubular member and fixed in said bearing ring, means for rotatably adjusting the position of said bearing ring about the longitudinal axis of said driven shaft; resilient means for normally depressing said driven shaft and said material-handling member when a small amount of material is wound on the latter; and means for adjusting the relation between said friction members associated with said driven shaft and with said driving shaft, comprising an eccentric mounting for said driving shaft adapted to permit changing the alinement between said driving and driven shafts in accordance with changes in the angle of tilt of said major axis.

12. In a gravity-controlled coil winding take-up mechanism, the combination with a fixed support having an opening; a friction drive element; a driven shaft; a friction-driven element on the driven shaft engageable with said friction drive element; and a take-up reel connected with the driven shaft, to which take-up reel the material to be wound is fed; of a sleeve supported for rocking movement in the said opening, said sleeve located intermediate the driven element and the take-up reel, the driven shaft extending through the sleeve; bearings in the sleeve to wholly support the driven shaft for rotation relatively to the sleeve, and to maintain the shaft concentric with the sleeve; means mounted on the frame adjacent the opening, for adjustment about the longitudinal axis of the driven shaft, said means embracing the sleeve; and pivotal connections between the sleeve and the adjustable means to support the driven shaft for rocking in a substantially vertical plane, in various tilted positions of the frame.

13. In a gravity-controlled coil winding mechanism, the combination with a friction drive element rotated at a uniform speed; and a driven shaft; of fulcrumed means normally supporting the shaft in a substantially balanced condition for rocking movement transversely of its longitudinal axis, and for rotation on its longitudinal axis; a friction driven element on the driven shaft, and engaged with the friction drive element; a take-up reel connected with the driven shaft, and to which reel the material is fed at a constant linear speed; a stationarily-mounted preloading device to apply its maximum pressure to the driven shaft in a direction transversely of the longitudinal axis of the driven shaft, and at a point off-set from the fulcrum of the driven shaft while the latter is in its normal idle position, to maintain suitable initial contact between the drive and driven friction elements, the increasing weight of the material wound on the reel being effective to rock the driven shaft in the same direction as that in which the pre-loading device urges the driven shaft, whereby the effect of the preloading device on the driven shaft is gradually superseded by the weight of the coiled material on the reel.

14. In a gravity-controlled coil winding mechanism, the combination with a friction drive element rotated at a uniform speed; a fulcrumed driven shaft; a friction-driven element on the driven shaft and engaged with the friction drive element; and a take-up reel connected with the driven shaft, and to which the material is fed at a constant linear speed; of means to adjustably support the driven shaft with its take-up reel and friction-driven element for both bodily rocking movement, and for bodily circular adjustment to compensate for different positions out of the horizontal in which the winding mechanism may be set; and a pre-loading device to apply pressure initially to rock the driven shaft with its friction-driven element and the reel in a direction to maintain a suitable initial pressure contact between the friction drive and the friction elements which initial pressure is overtaken and superseded by the increasing weight of the material being wound on the reel.

WILLY BORBERG.

REFERENCES CITED

The following references are of record in the file of this patent:

UNITED STATES PATENTS

| Number | Name | Date |
|---|---|---|
| 1,277,559 | Emory | Sept. 3, 1918 |
| 1,827,893 | Kendelmann | Oct. 20, 1931 |
| 1,850,755 | Kendelmann | Mar. 22, 1932 |
| 2,280,727 | Stechbart | Apr. 21, 1942 |
| 2,343,961 | Del Valle | Mar. 14, 1944 |
| 2,436,418 | Bradford | Feb. 24, 1948 |
| 2,472,983 | Nemeth | June 14, 1949 |